United States Patent [19]

Crampton

[11] Patent Number: 4,885,521

[45] Date of Patent: Dec. 5, 1989

[54] UNIQUE COMPUTER POWER SYSTEM WITH BACKUP POWER

[75] Inventor: Timothy P. Crampton, Marietta, Ga.

[73] Assignee: Applied Research & Technology, Inc., Atlanta, Ga.

[21] Appl. No.: 132,995

[22] Filed: Dec. 15, 1987

Related U.S. Application Data

[63] Continuation of Ser. No. 927,657, Nov. 5, 1986, abandoned, which is a continuation-in-part of Ser. No. 769,358, Aug. 26, 1985.

[51] Int. Cl.⁴ .............................. H02J 7/00; H02J 9/00
[52] U.S. Cl. ........................................ 320/14; 307/66
[58] Field of Search ....................... 320/14; 307/64, 66

[56] References Cited

U.S. PATENT DOCUMENTS

| | | | |
|---|---|---|---|
| 3,603,973 | 9/1971 | Hough | 340/409 |
| 3,721,887 | 3/1973 | Nickerson | 320/13 |
| 4,327,298 | 4/1982 | Burgin | 307/66 |
| 4,441,031 | 4/1984 | Moriya et al. | 307/66 |
| 4,533,196 | 11/1985 | Tokuyama et al. | 363/21 |
| 4,672,293 | 6/1987 | Crampton | 320/14 |
| 4,675,538 | 6/1987 | Epstein | 307/64 |

Primary Examiner—R. J. Hickey
Attorney, Agent, or Firm—Louis T. Isaf

[57] ABSTRACT

A computer power system comprises an AC-to-DC power supply for providing DC power to the computer during the presence of AC line power and a backup power supply for providing DC power from batteries directly to the DC operated components of the computer system, completely bypassing the AC to DC power supply, when AC line voltage is absent or low.

9 Claims, 4 Drawing Sheets

UNIQUE COMPUTER POWER SYSTEM WITH BACKUP POWER

This application is a continuation of application Ser. No. 927,657 filed Nov. 5, 1986 now abandoned which application is a continuation-in-part of application Ser. No. 769,358 filed Aug. 26, 1985, entitled "POWER-SUPPLY/BATTERY BACK-UP POWER SUPPLY/BATTERY CHARGER COMBINATION".

FIELD OF THE INVENTION

This invention relates generally to the field of power supply systems for computer systems and more specifically to power supply system including battery backup power systems for computer systems.

BACKGROUND OF THE INVENTION

All computer users are very familiar with the frustration resulting from a loss of electricity during computer operation. Entire reports, the annual spread sheet, a company's complete client record, any file, can be lost forever due to an instantaneous dip in voltage, or loss of voltage, as supplied by the local utility company. The results are anger, loss of valuable time, possible loss of an important contract, and tremendous expense of recompiling and reentering data.

Backup power systems are the valuable computer accessory that provides power to your computer when the normal source of power fails. There are in the industry today dozens of backup power systems, all claiming to be different in some way, yet all sharing the same basic concept. All prior art backup power systems known to the present inventor share the same underlying concept: AC line voltage is converted to DC voltage and then inverted back to AC voltage. At the core of all of them is a set of batteries that store enough electrical energy to keep your computer running when no other power is available. The prior art backup power supplies require inverters to make the conversion from the DC battery output to the AC input of the computer system's built-in power supply. Many systems also have built-in battery chargers.

Prior art backup power systems have numerous variances and concerns which make choosing the proper system for your needs an unenviable task. Some variances and concerns include: (1) input power demand of your computer, i.e. 250–400 VA; (2) output wave form of the backup power system, i.e. sine-wave, square-wave, stepped square-wave; (3) battery size and quantity; (4) backup power supply time; (5) size and weight of entire system; (6) linear vs. switcher conversion technology; (7) system noise. Many of the difficult decisions and concerns of prior art systems result from the need to invert the battery DC output to computer AC input.

SUMMARY OF THE INVENTION

Briefly described, the present invention comprises a unique method of powering a computer system which unique method utilizes the pre-existing computer power supply together with a supplemental DC backup system to provide continuous power to the computer system.

The apparatus of the present invention comprises a backup power assembly including batteries, a battery charging circuit and a regulator circuit for converting the battery DC output to various, acceptable DC input power for the computer system. The apparatus includes a cabling device connecting the regulated DC output of the backup power system directly to the motherboard of the computer system. The cabling device includes an interface member providing an interconnect among the pre-existing power supply of the computer system, backup power assembly, and the motherboard of the computer system. The backup power assembly of the present invention supplies only DC power to the motherboard of computer system for operation of the microprocessor, memory, disc drives and other DC operated add-ons. Unlike the prior art, the backup power system of the present invention operates the central processing unit and disc drive without providing backup AC power and without the use of DC-to-AC inverter technology.

The method and apparatus of the present invention provide AC power directly to the pre-existing, internal power supply of the computer, independently of the backup power assembly. This AC power is converted by the internal power supply, as typical in the industry, to DC power supplied to the DC power bus of the central processing unit. At the same time, AC power is independently supplied to the backup power assembly for charging the batteries. The present invention senses a drop in voltage at the output of the internal, computer power supply and automatically compensates for the drop by immediately supplying DC voltage from batteries to the computer components, with no switching time nor loss of critical voltage.

It is, therefore, an object of the present invention to provide a computer power system for continuously providing current and voltage to the computer components, which power system includes the internal, computer power supply supplying DC power to the computer components during presence of AC line voltage and a supplemental, backup power supply supplying DC power from batteries to the computer components during absence of AC line voltage.

Another object of the present invention is to provide a backup power system, which, in the absence of AC line voltage, supplies DC voltage direct to the computer DC power bus and, thus, to the computer components, and by-passes the internal, AC, computer power supply.

Yet another object of the present invention is to provide a relatively lightweight, relatively compact backup power system for maintaining operation of a computer system during absence of AC line voltage.

Still another object of the present invention is to provide a method and apparatus for powering a computer system in the absence of AC line voltage and without inverting battery DC power to AC power.

Another object of the present invention is to provide sufficient battery backup power, in a relatively small package, to maintain operation of the computer for a relatively long period of time.

Other objects, features, and advantages of the present invention will become apparent upon reading and understanding the following specification, in conjunction with the accompanying Drawings.

DETAIL DESCRIPTION OF THE PREFERRED EMBODIMENT

Figure 1:
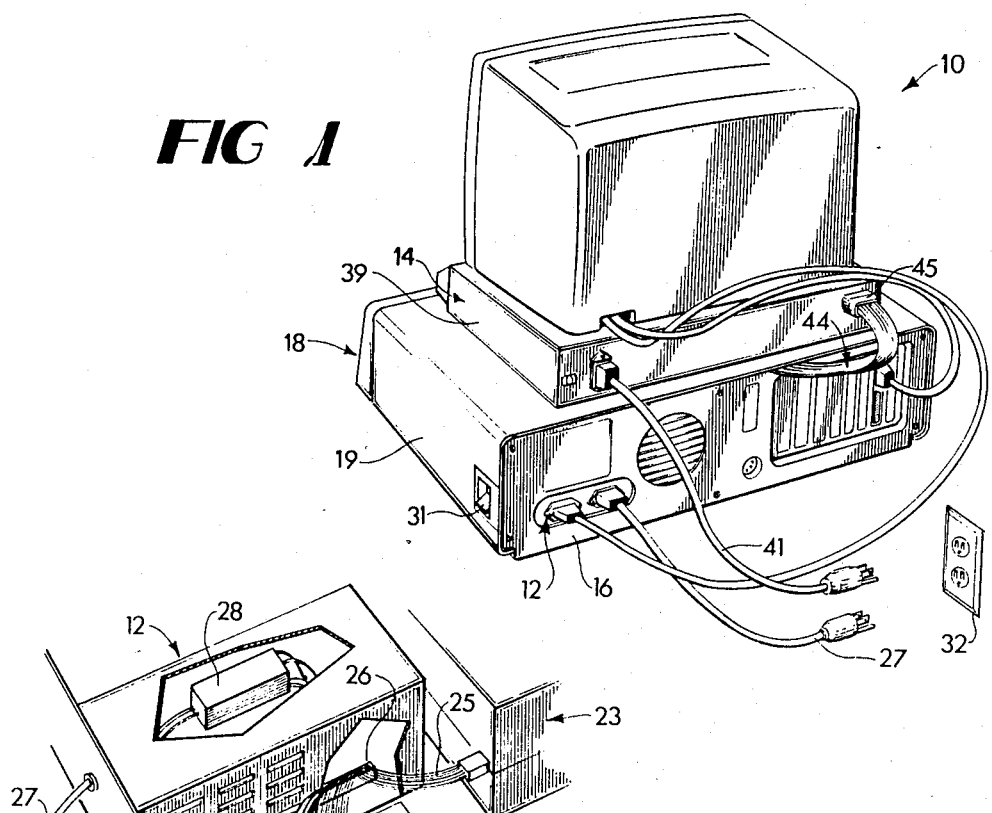
FIG. 1 is a pictorial representation of a computer system outfitted with the computer power system in accordance with the present invention.

Referring now in greater detail to the drawings in which like numbers represent like components throughout the several views, FIG. 1 shows the Computer Power System 10, in accordance with the present invention, comprising a first power supply 12 and a second power supply 14. The first power supply 12 comprises the internal power supply 12 built into the enclosure chassis 16 of the computer processing unit 18. The second power supply 14 comprises an external power supply 14 connected to the computer processing unit 18 by a harness assembly 44.

The computer processing unit 18 is any computer processing unit known in the art and its component parts and operation are deemed sufficiently known so as to not require detailed explanation here. The computer processing unit 18 is that of a mainframe, mini-frame, micro or personal computer or any other computer. In general, the computer processing unit 18 is comprised of a plurality of components whose operation is dependant upon the presence of DC power. DC power is disseminated among the components by means of a conductive network which we shall term the DC power bus. In preferred embodiments of the present invention, the computer processing unit 18 is that of a personal computer such as, for example, the IBM® PC/XT, or the EPSON® EQUITY II, or the ZENITH® 248 PC. The computer processing unit 18 seen in the embodiment of FIG. 2 includes a motherboard 22 (with microprocessor and memory chips), disc drive 23 and power connector 24. The present invention is not to be limited by the specific arrangement or type of components shown in FIG. 2. Mounted to one corner of the chassis 16 of the computer processing unit 18, and internal to the chassis is the first power supply (internal power supply) 12. The components and operation of such first power supply are as known in the art and only relevant features are expressed herein. The internal power supply 12 is seen as comprising an AC power input cord 27, for connecting to an AC power source 32 and for conducting AC input power to the first power supply, and an AC-to-DC converter 28 for converting the AC input power to DC output power (with added components and circuitry as known in the art). The DC output power from this first power supply 12 is provided to a distribution block 26. Power output wiring 29 connects the distribution block 26 to the power connector 24 of the motherboard 22 of the computer processing unit 18 using output plug 30. A disc drive connector 25 connects the distribution block to the disc drive 23.

The disc drive connector 25, distribution block 26, power output wiring 29, power connector 24 and power traces (not shown) of the motherboard 22 comprise at least a portion of the DC power bus of the computer processing unit 18.

The second (external) power supply 14 is seen in FIG. 1, FIG. 3 and FIGS. 4–4c as comprising: an enclosure 38 housing a plurality of batteries 33–37; and a circuit component 40 including a combination AC-to-DC rectifying circuit 66, DC battery charging circuit 68 and regulating circuit 69, together with other below described circuitry; an AC power input cord 41 for connection to an AC power source 32; and the power harness assembly 44.

Figure 5:
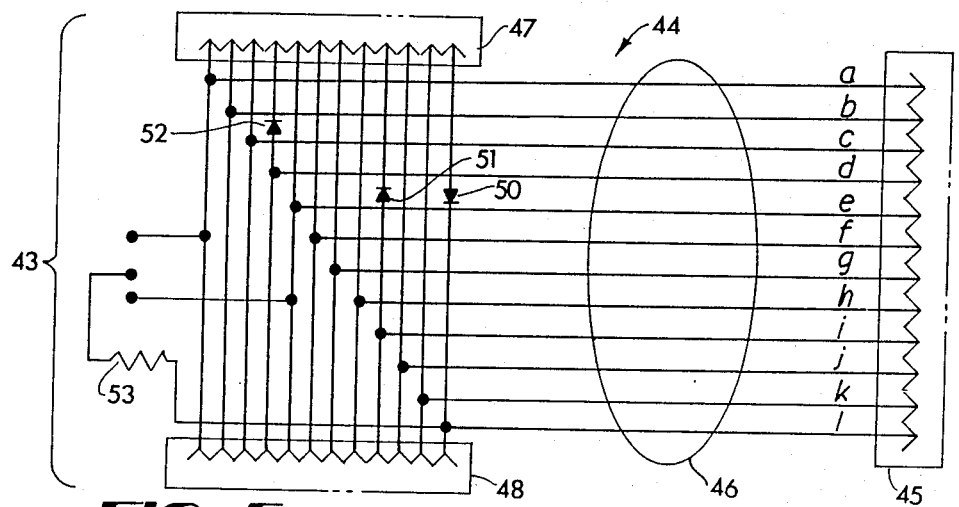
FIG. 5 is a schematic representation of the electrical components and connector elements of one embodiment of the harness assembly used in accordance with the present invention.
Figure 6:
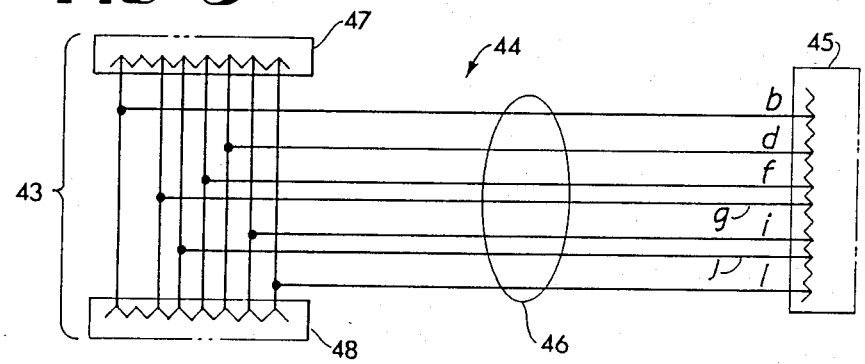
FIG. 6 is a schematic representation of the harness assembly of FIG. 5, showing an alternate embodiment.

The harness assembly 44 is a removable and interchangeable harness which adapts the output array of voltages and currents to the specific, physical arrangement of the power input connector 24 for the specific computer processing unit 18 to which the second power supply 14 is supplying backup power. Two examples of harness assembly embodiments are seen in FIGS. 5 and 6. Each harness assembly is seen as comprising a jack attachment 44, an interfacing element 43 and wiring 46 (preferably in the form of wrapped cabling) connecting the jack attachment to the interfacing element. The interfacing element 43 includes a first plug member 47 and a second plug member 48. It will be noted that, in all embodiments, the jack attachment 45 is common as it must be connected to the cabling jack 21 of the output cable assembly 20 from the second power supply 14. It is at the interfacing element 43 that the physical arrangement of the voltages and current outputs and the physical size and shape of the first and second plug members 47, 48 are matched to the physical requirements of the host computer processing unit 18. At the interfacing element 43, the power output wiring 29 from the first power supply 12 is plugged into the first plug member 47, and the second plug member 48 of the interfacing element 43 is plugged into the computer processing unit power input connector 24 at the motherboard 22.

Figure 4:
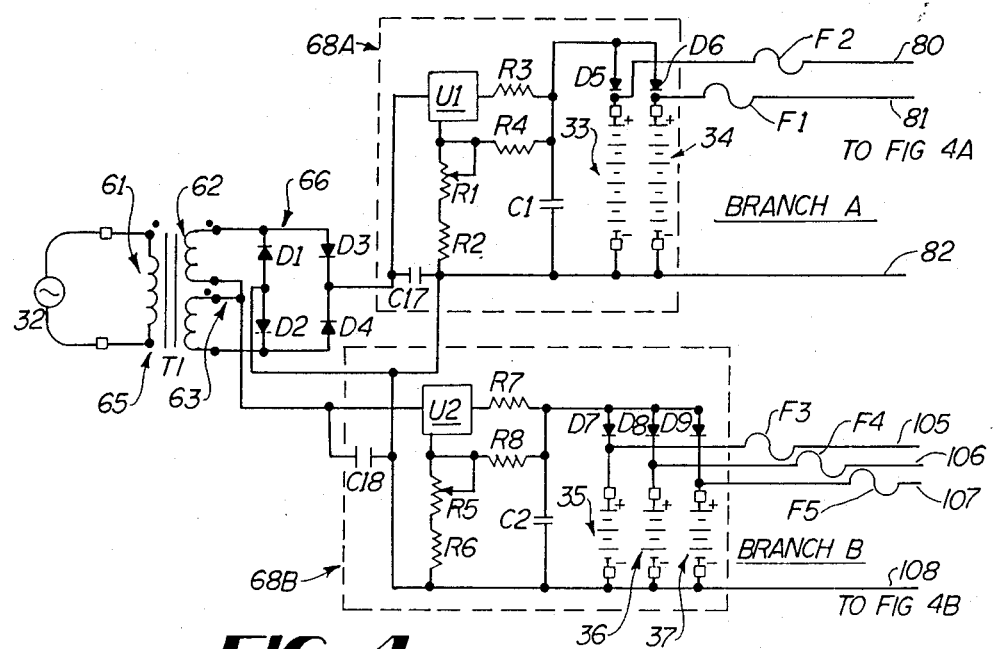
FIGS. 4, 4A, 4B, 4C are schematic representations of the electronic circuitry of the backup power supply of the computer power system of FIG. 1.

Referring more particularly to FIG. 4, the circuit component 40 of the second power supply 14 is shown in detailed schematic. The embodiment of FIG. 4 is a preferred embodiment whose function is to deliver an array of DC output voltages. The output voltages and currents delivered by this preferred embodiment are matched to the DC input requirement of the typical, state of the art personal computers, at the time of this disclosure. The majority of known personal computers are serviced by the herein described embodiment of the present invention since their required input voltages to run the motherboard, microprocessor and disc drives are adequately met by the output voltages and currents generated by the circuit component 40 of the embodiment in FIG. 4. It is within the scope of the present invention to modify the circuit component 40 to deliver different output currents and voltages as required by a specific computer; and the present invention is not to be limited by the make, model or type of computer, whether now known or known in the future, nor by the specific circuit component 40 disclosed herein.

Figure 4A:
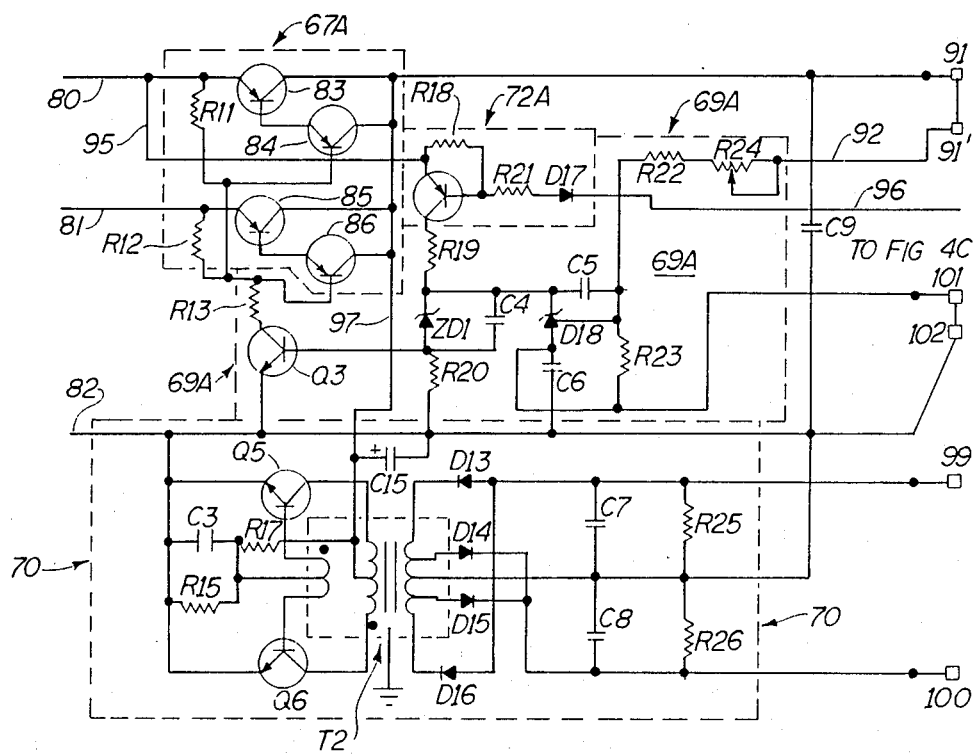
Figure 4B:
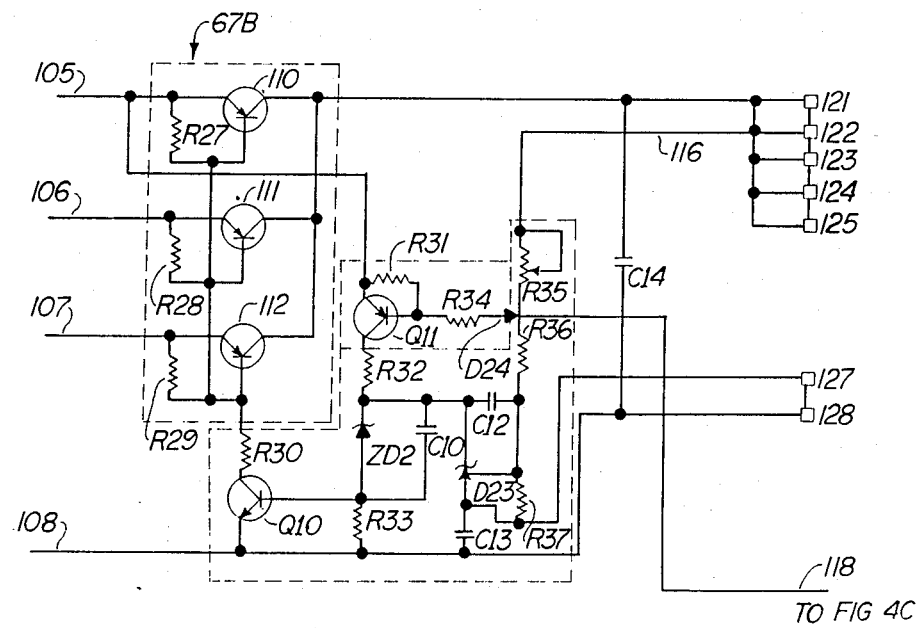
Figure 4C:
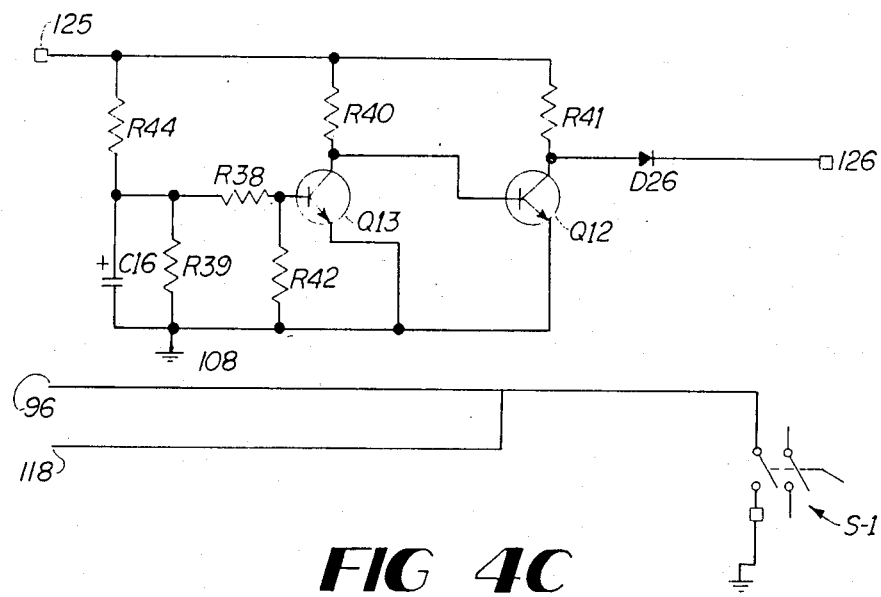

With reference to FIGS. 4–4C, the preferred embodiment of the circuit component 40 of the second power supply is shown as comprising a transformer 65 for stepping down AC voltage from the line voltage to a lesser, desired voltage. A bridge rectifier 66 converts the step down AC voltage to a rectified unidirectional current and voltage (i.e. rectified DC). This rectified DC is divided into two branches indicated as "Branch A" and "Branch B". Branch A is connected across the plus terminal "C" and negative terminal "D" of the rectifier 66. Branch B is connected at the negative terminal "D" of the rectifier 66 and at the mid-terminal 63 of the transformer output coil 62. Each branch comprises a battery charging circuit 68A, 68B, batteries 33–37, a current pass circuit 67A, 67B, a regulator circuit 69A, 69B and an enable circuit 72A, 72B. Furthermore, Branch A also comprises a DC/DC converter circuit 70; and Branch B comprises a logic control circuit 71.

The battery charging circuit 68A of Branch A comprises a filter capacitor C17 in parallel with a combination of elements functioning as a regulating circuit. The elements of the charger regulating circuit include a regulator U1, variable resistor R1, resistors R2, R3, R4, capacitor C1 and diodes D5, D6. There is a separate diode D5, D6 associated with each of the batteries 33, 34 to be charged by the charging circuit 68A. It is the function of this charging circuit 68A to regulate the rectified DC to an output voltage and current appropriate for charging the batteries 33–34 of Branch A. As noted, the batteries 33, 34 are charged in parallel. Output from the battery charging circuit 68A and from the batteries 33, 34 is along output lines 80, 81. The common ground line for Branch A is line 82. Each of the output lines 80, 81 is provided with a fuse F1, F2.

Continuing with the description of Branch A, attention is directed to FIG. 4A, which is a continuation of Branch A. DC current output from the charging regulator circuit 68A and/or from the batteries 33, 34 encounters a current-pass circuit 67A. The current-pass circuit 67A includes four current-pass transistors 83, 84, 85, 86. Two current-pass transistors 83, 84 and 85, 86 are associated with each of the output lines 80, 81. Associated with each parallel pair 83, 84, and 85, 86 of current-pass transistors is a pull down resistor 88, 89 which also comprises a portion of the current-pass circuit 67A. When "turned on", the current-pass transistors 83–86 convey current and regulated voltage to the backup power supply 14 output terminal 91.

The regulator circuit 69A of Branch A is shown as comprising resistor R13, transistor Q3, resistor R20, zener diode ZD1, resistor R19, capacitor C4, capacitor C6, zener diode D18, capacitor C5, resistors R22, R23 and variable resistor R24. The regulator circuit 69A functions to provide a pulsing gate current to the current-pass transistors 83–86. The regulator circuit generates the pulsating gate current and voltage in response to the sensed output voltage at output terminal 91, 91' to regulate the output voltage of Branch A at terminal 91 about a predetermined, desired DC output. The output voltage at terminal 91 is sensed at terminal 91' and "fed back" to the regulator circuit 69A through the sensor feed back line 92. The regulator circuit is selectively enabled or disabled by operation of the "enable circuit" 72A which comprises transistor Q4, resistors R18, R21 and diode D17. The circuit through the enable circuit 72A is opened and closed through the action of the master switch S-1 shown on FIG. 4C. The enable circuit 72A is connected with switch S-1 by line 96. With switch S-1 in the open position, the enable circuit 72A is off; and, thus, the regulator circuit 69A is inoperative and the current pass transistors 83–86 are in the "off" state preventing the passage of current from charger and battery output lines 80, 81. Thus, with switch S-1 open, and AC power provided at the transformer 65, only the battery charging circuit 68A is in operation in Branch A. When the master switch S-1 is closed, the circuit through the enable circuit 72A is closed allowing current to flow from the battery 33,34 and battery charging circuits 68A through line 95 to and through the enable transistor Q4 into the regulator circuit 69A at resistor R19. The regulator circuit 69A is now "enabled" with power to perform its regulating function in response to the voltage feedback along sensory feedback line 93.

As seen in FIG. 4A, Branch A of the preferred embodiment of the present invention further includes a DC/DC converter circuit 70. The DC/DC converter circuit 70 is built around the output line 97 of the current pass transistors 83–86 and the Branch A ground line 82. The DC/DC converter circuit 70 includes capacitor C15, transistors Q5, Q6, capacitors C3 and resistors R15, R17 all to the primary side of DC/DC transformer T2. To the secondary side of the transformer T2, the converter circuit 70 includes four diodes D13, D14, D15, D16, two capacitors C7, C8, and two resistors R25, R26. The converted DC outputs are provided at Branch A output terminals 99 and 100. Branch A is provided with output ground terminals 101, 102.

Referring back to FIG. 4, Branch B is seen as comprising a battery charging circuit 68B with circuit architecture similar to that of battery charging circuit 68A of Branch A. The Branch B battery charging circuit 68B includes capacitor C18, regulator U2, resistors R6, R7, R8, adjustable resistor R5, capacitor C2 and diodes D7, D8, D9. Each diode is associated with a single battery 35, 36, 37. Output from the battery charging circuit 68B and from the batteries 35–37 is along output line 105, 106, 107. The common ground line for Branch B is line 108. Each of the output lines 105, 106, 107 is provided with a fuse F3, F4, F5.

The continuation of Branch B is seen on FIG. 4B. Each of the output lines 105, 106, 107 leads to the current pass circuit 67B. The current pass circuit includes a current pass transistor 110, 111, 112 and a resistor R27, R28, R29 associated with each of the output lines 105, 106, 107. In a manner similar to that described with respect to regulator circuit 69A of Branch A, a regulator circuit 69B, when enabled, generates a pulsing gate current at each of the current pass transistors 110, 111, 112 to result in a regulated output at Branch B output terminals 121–125. The sensed voltage about which the output voltage is regulated is "fed back" to the regulator circuit 69B through sensory feedback line 116. The regulator circuit of 69B of Branch B is seen as including resistors R30, R32, R33, R36, R37, variable resistor R35, capacitors C10, C12, C13, zener diode ZD2, D23, and transistor Q10. The enable circuit 72B for the Branch B regulator circuit 69B is seen as comprising resistors R31, R34, diode D24, and transistor Q11. The enable circuit 72B is connected by line 118 to the master switch S-1 seen in FIG. 4C.

With the master switch S-1 in the open position the enable circuit 72B is off and, thus, the regulator circuit 69B is inoperative and the current pass transistors 110–112 are in the "off" state preventing the passage of current from the battery, and battery charger output lines 105, 106, 107. Thus, with the master switch S-1 open, and AC power provided at the transformer 65, only the battery charging circuit 68B is in operation in Branch B. When the master switch S-1 is closed, the enable circuit 72B is activated allowing current to flow through transistor Q11 to the regulator circuit 69B. The regulator circuit 69B is now "enabled" (switch S-1 closed) with power to perform its regulating function in response to the voltage feedback along sensory feedback line 116.

With reference to FIG. 4C, a logic control circuit 71 is seen as being built about one output terminal 125 of Branch B and the Branch B ground line 108. This circuit 71 is seen as comprising resistors R38, R39, R40, R41, R44, capacitor C16, diode D26 and transistors Q12, Q13. This logic control circuit 71 looks for power stabilization at the Branch B output terminals 125 and then sends a signal at output terminal 126 to reset and maintain the computer logic circuits in computer processing unit 18, thereby activating the processing unit. This "logic control" output is generated in preferred embodiments of the present invention to supply a signal required by certain host computers as required by the design of the host computer in the prior art. For example, such logic control output is the "power good" signal found necessary for proper operation of IBM ® personal computers.

It can be seen by comparison of FIGS. 4-4C and the harness figures, FIGS. 5 and 6, that the output provided by Branch A and Branch B of the second power supply 14 are provided to the host computer processing unit 18 through the interchangeable harness assemblies 44.

Component Specifications for the Specific Example

The drawings accompanying this specification are provided with a specific example of circuitry and circuit components capable of providing the output voltages of the preferred embodiment of the second power supply 14 of the present invention. Below is a listing of component specifications for the example circuitry of the accompanying drawings. Part numbers refer to known, industry designations at the time of this writing. Unless otherwise stated, resistor values are in ohms, ¼ watt, ±5% and capacitor values are in microfarads, ±20%, aluminum electrolytic.

transformer T1—115 volts Ac, 50/60 HZ primary coil input; 15.5 RMS volts, 1.55 amps secondary output; 7.75 volts, 3.1 AMPS at midterminal rectifier 66—Diodes D1, D2-part no. MR501(Motorola) Diodes D3, D4-part no. 1N4002(Motorola)

BRANCH A regulators U1—part No. LM317(Motorola)
R1—1K
R2—1K, 1%
R3—1 Ohm, 2 watts
R4—121 Ohms, 1%
C17—100 microfarad, 25 volts
C1—10 microfarads, 16 volts
D5, D6—part No. 1N4002(Motorola)
Batteries 33, 34—nominal 12.2 volts DC, 6.2 Amp hour each battery; charging voltage at least as low as 13.9 volts. Float charge charging circuiting a fixed voltage, floating current design type.
F1, F2—10 amp, 3 AG
R11, R12—10 Ohms
transistors 83, 84, 85, 86—Part No. 2SB-826(Sanyo)
R13—400 Ohms, 5 watts; R18—10K; R—470 Ohms; R20—1K;
R21—10K; R22—7.5K, 1%; R23—2.49K, 1%; R24—1K Q3—part no. TIP 120(Motorola); Q4-ZN3906(Motorola)
C4—10 microfarad, monolithic ceramic; C5—0.01 microfarads,
50 volts; C6—100 microfarads, 16 volts; C9—1,000 microfarads, 16 volts
ZD1—part no. IN5527B(Motorola); D18—part no. TL-431-(Reference Diode, Fairchild)
Q5, Q6—part No. TIP31A(Motorola)
C3—10 microfarads; C15—100 microfarads; C7—100 microfarads, 16 volts. C8—100 microfarads, 25 volts
R15—47 ohms; R17—220 Ohms, 3 watts; R25—220 Ohms, 3 watts; R26—220 Ohms, 3 watts
D13, D14, D15, D16—Part NO. 1N4935(Motorola)
T2—DC/DC inverter transformer, 12 volt in/−12 volts & −5 volts out; 0-500 ma each.

Branch B

C18—100 microfarad, 25 volts; C2—10 microfarads, 16 volts U2-part No. LM317(Motorola)
R5—1K; R6—220 Ohms, 1%; R7—0.5 Ohms, 2 Watts; R8—121 Ohms, 1%
D7, D8, D9—part No. MR501(Motorola) Batteries(Panasonic) 35, 36, 37—Nominal 6.4 volt DC, 10 amp hour each battery; charging voltage at least as low as 6.9 volt. Float charge charging circuit is a fixed voltage, floating current design type.
F3, F4, F5—10 amp, 3AG
R27, R28, R29—47 Ohms
Transistors 110, 111, 112—Part 25B-826(Sanyo)
R30—5 Ohms, 10 Watts; R31—10K; R32—470 Ohms; R33—1K; R34—4.7K; R35—1K; R36—1K, 1%; R37—2.49K, 1%
C10—10 microfarad; C13—0.01 microfarads monolithic ceramic; C13—100 microfarad, 16 volts; C14—4700 microfarads, 6.3 volts
Q10—Part No. TIP120(Motorola); Q11—Part. No. 2N3906(Motorola)
ZD2—Part. No. IN5519B(Motorola); D23—Part No. TL431(Reference diode, Fairchild); D24—Part No. IN914B(Motorola)
R38—33K; R39—10K; R40—10K; R42—10K; R41—1K; R44—10K
C16—100 picofarad, 16 volts
D26—Part No. IN817(Motorola)
Q13—Part No. 2N3904(Motorola); Q12—Part No. MPSA13(Motorola)

Ouptput Specifications of the Specific Example

In the specific example of the preferred embodiment herein, Branch A is designed to provide +12 volts (nominal), −12 volts and −5 volts output from the second power supply 14 at terminals 91, 99, 100, respectfully; Branch B is designed to provide nominal +5 volts output from the second power supply 14 at terminals 121-124, 126. The nominal voltages, that is +12 volt and +5 volt, are controlably variable within a range so as to make the output voltages adaptable to their function as "backup power" as discussed below. Thus, the target voltage at Branch A output terminal 91 is 11.91 volts and the regulator circuit 69A is set to regulate about a 11.91 volt sensed voltage at feedback line 92. Likewise, the target voltage at Branch B output terminal 121-125, is 4.86 volts DC and the regulator circuit 69B is set to regulate about a 4.86 volt sensed voltage at the feedback line 115. At the same time, in the specific example of the preferred embodiment, the voltage present at lines 80, 81 is 13.9 volts (the battery charging voltage) when AC power is present at the transformer 65 and is a nominal 12.40 volts battery discharge voltage when AC power is absent and the batteries 33–34 are discharging. Likewise, the voltage present at line 105, 106, 107 is 6.9 volts (the battery charging voltage) when AC power is present at transformer 65 and is a nominal 6.20 volt battery discharge voltage when AC power is absent and batteries 35–37 are discharging. In light of these specifications, it can be seen that the current pass transistors 83–86 of Branch A and 110–112 of Branch B must generate a low collector-emitter voltage saturation drop. Thus, the selection of the current-pass transistors 83–86, 110–112 is a very critical factor and the interrelationship among the battery charging circuit 68A, 68B, batteries 33–34, 35–37, current-pass circuit 67A, 67B and output voltages at the backup power supply output terminals 91, 99, 100, 121–124, 126 is a unique and inventive interrelationship subject to the prior, parent application cited above, of which this is a continuation-in-part. The specification of the parent application is hereby made a part hereof by reference.

Figure 7:
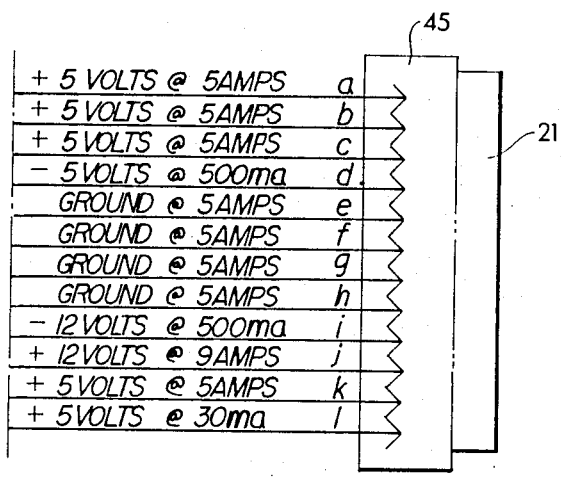
FIG. 7 is a statement of the arrangement of output voltages and currents leaving the second power supply at the cabling jack, in accordance with a specific example of one embodiment of the present invention.

The outputs from the circuit component 40 are picked up at the respective terminals and conducted by the cable assembly 20 to the cabling jack 21. In the specific example of the preferred embodiment of the present invention, these outputs from the back-up power supply 14 are oriented at cabling jack 21 in the arrangement disclosed in FIG. 7. Referring again to FIGS. 5 and 6, the specific embodiment of the harness assembly 44 shown in FIG. 5 shows the schematic of a harness assembly 44 specifically designed for interface with the power input connector 24 of an IBM ® PC/XT. The embodiment shown in FIG. 6 shows the schematic of a harness assembly 44 specifically designed for interface with the power input connector 24 of an Epson ® Equity II. It can be seen that the harness assembly 44 of FIG. 5 conducts the full complement of output depicted in FIG. 7; while the harness assembly of FIG. 6 conducts only a portion of the available output signals from cabling jack 21. The different harness assembly 44 embodiments of FIGS. 5 and 6 are shown, through the wiring matrix within interfacing element 43, to present different physical arrangements of output voltages and currents between the first plug member 47 and second plug member 48.

With specific reference to FIG. 5, it is noted that, for use with the IBM ® PC/XT, a first diode 50 in the +5 volts @ 30ma line (line "1"), is positioned to restrict conduction of the signal from the interfacing element 43 into the first power supply 12. Since the IBM ® PC/XT utilizes this signal as its "power good" signal, a pull down resistor 53 connects the outboard side of the first diode 50 to ground. Second diode 51 and third diode 52 are placed in the −12 volt @ 500ma line (line "i") and −5 volt @ 500ma line (line "d"), respectively, restricting conduction to the first power supply 12 from the interfacing element 43. These electronic components within the interfacing element 43 are selected by experimentation and evaluation of the physical characteristics of the first power supply 12. In many embodiments, backfeeding of power to the first power supply is not detrimental to the first power supply and, in such cases, diodes 51 and 52 are eliminated; also, in certain embodiments, a "power good" signal similar to that of the IBM is not required and thus diode 50 and resistor 53 are eliminated. (Reference FIG. 6.)

Operation. The circuit compnent 40 is constructed with the transformer 65, rectifier 67, battery charging circuit 68A, 68B, current-pass circuit 67A, 67B, regulator circuit 69A, 69B, DC/DC inverter circuit 70, enable circuit 72A, 72B, and logic control circuit 71 (if appropriate); the preferred embodiment being as described above. The completed circuit board 40 is mounted into the enclosure 38 together with each of the batteries 33–37. The batteries 33–37 are connected to the circuit component 40 as would be appropriate in accordance with FIGS. 4–4C. The cable assembly 20 connects the circuit component 40 to the cabling jack 21 mounted at the rear of the housing 38. The cable assembly 20 comprises a plurality of wires, each wire connecting one of the output or output ground terminals 91, 99–102, 121–124, 126–128 to a separate pin within the cabling jack 21. The AC power source 41 for the backup power supply 14 is connected to the circuit component 40. The cover 39 (see FIG. 1) is placed on the backup power supply 14. The backup power supply 14 is now ready for connecting to the computer processing unit 18 of the computer system.

Figure 2:
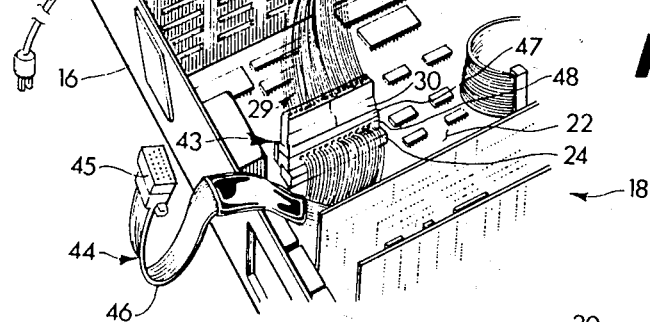
FIG. 2 is a cutaway view of a computer processing unit and internal power supply of the computer power system of FIG. 1.

The hood 19 of the computer processing unit 18 is removed to bear the internal components as shown in FIG. 2. With reference to FIG. 2, the user installs the harness assembly 44 into the computer processing unit 18 by connecting the power output plugs 30 of the power output wiring 29 from the first power supply distribution block 26 into the first plug member 47 of the interfacing element 43 of harness assembly 44; and then plugging the second plug member 48 of the interfacing element 43 into the power input connector 24 of the motherboard 22. The hood 19 is then replaced on the computer processing unit 18 with the jack attachment 45 of the harness assembly 44 protruding from the back of the processing unit 18 as seen in FIGS. 1 and 2.

Figure 3:
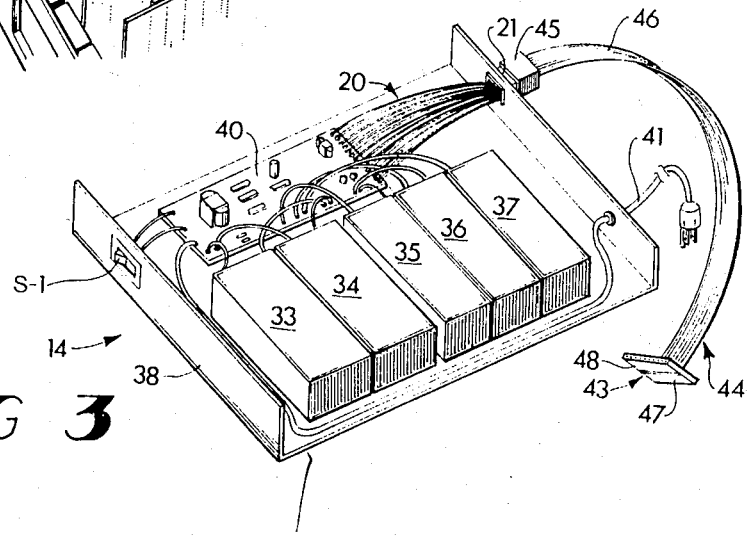
FIG. 3 is a view of the backup power supply of the computer power system of FIG. 1, with the cover removed.

The jack attachment 45 of harness assembly 44 is plugged into the cabling jack 21 at the back of the backup power supply 14, as seen in FIGS. 1 and 3. Both the AC power cord 27 of the first power supply 12 and the AC power cord 41 of the second power supply 14 are connected to a source of AC power. The first power supply 12 is turned on at its power switch 31 whereby AC power is provided to the first power supply 12. The first supply inverts the AC power, in a manner known in the art, to DC power provided at the first power supply distrubtion block 26. From the distribution block 26, the appropriate DC power is distributed by way of output wiring 29 and power output plug 30, to the interfacing element 43 at the first plug member 47, through interfacing element 43 to the second plug member 48 (reference FIG. 5), to and through the power input connector 24, to the motherboard 22. DC power is distributed from the distribution block 26 to the disk drive 23 by way of the disk drive power connector 25. Thus, DC power from the first power supply 12 is provided directly to the DC bus.

At the same time, AC power is being provided to the circuit component 40 of the second power supply 14. With the switch S-1 in the "off" position, this AC power is continually charging the batteries 33–37 through battery charging circuits 68A, 68B. The switch S-1 is then turned "on", enabling the regulator circuit 69A, 69B and resulting in regulated, DC power being provided at the various output terminals 91, 99, 100, 121–124, 126. When AC power is present, the DC voltages provided at the circuit component 40 output terminals are, as described above, selected, regulated voltages resulting from regulation of the charging voltages of the various batteries 33-37. When AC power is absent, the batteries 33-37 provide power to the circuit component 40 output terminals at the same, selected, regulated voltages.

The regulated output power from the circuit component 40 is conducted through the cable assembly 20 through the cabling jack 21, to the jack assembly 45 and through the harness assembly 44, to the interfacing element 43. From the interfacing element 43, power is provided through the second plug 48, through the power input connector 24 to the motherboard 22; and power is provided through the first plug member 47, back through the power output wiring 29 to and through distribution block 26, through the disk drive power connector 25 to the disk drive 23. Thus, DC power from the second power supply is provided directly to the DC bus.

The regulated output voltages of the circuit components 40 are purposely tuned to deliver a regulated voltage slightly less than the output voltages provided by the first power supply 12 during its normal operation with AC power present. In this way, all power to the DC bus is normally provided by the first power supply 12 (the supplier of the higher voltage). When AC power vanishes or the output voltage from the first power supply 12 drops below the output voltage of the circuit component 40, then current from the second power supply 14 is immediately provided to the DC bus through the path previously described.

Thus, it can be seen, that the present invention provides DC operating power to the computer processing unit 18 only through the first power supply while adequate AC power is present; and provides all DC operating power to the computer processing unit 18 from the external power supply 14 when adequate AC power is not present.

Whereas the present invention has been described with specific detail to preferred embodiment and examples thereof, it will be understood that variations and modifications can be effected within the spirit and scope of the invention as described hereinbefore and as defined in the appended claims.

I claim:

1. In combination,
   a computer device comprising, at least, a microprocessor and a DC power bus;
   first power means for providing DC power to said computer device, said first power means comprising, at least, first AC/DC converter means for converting AC power input to DC power output at a first voltage;
   power connect means for communicating said DC power output of said first power means to said DC bus of said computer device;
   second power means for providing DC power to said computer device, said second power means comprising at least one DC battery for providing a DC output, first current pass means for controlling the flow of current from said battery to said computer, and first regulating means for regulating operation of said current pass means, whereby a target voltage output is provided from said second power source, and
   second power connect means for communicating said DC output of said second power means directly to said DC bus of said computer device;
   battery charging means for providing charging voltage to said DC battery of said second power means;
   whereby the computer device is powered by DC power from said first power means so long as said first voltage is maintained higher than said target voltage, and is powered by DC power from said second power means when said first voltage drops below said target voltage.

2. Combination of claim 1, wherein said second power means further comprises, at least, DC/DC inverter means for inverting DC battery output voltage to, at least, a second output voltage being of negative voltage.

3. Combination of claim 2, wherein said DC/DC inverter means further inverts DC battery output voltage to a third output voltage being negative voltage.

4. In combination,
   a computer device comprising, at least, a microprocessor and a DC power bus;
   first power means for providing DC power to said computer device, said first power means comprising, at least, AC/DC converter means for converting AC power input to DC power output at a plurality of primary voltages in an array of varied voltages;
   power connect means for communicating said DC power output of said first power means to said DC bus of said computer device;
   second power means for providing DC power to said computer device, said second power means comprising, at least, DC battery means for providing DC power at at least a first discharge voltage, and circuit means for generating from said first discharge voltage DC output at a plurality of secondary voltages in an array of varied voltages corresponding to said primary voltages; and
   second power connect means for communicating said DC output of said second power means directly to said DC bus of said computer device;
   whereby the computer device is powered by DC power from said first power means so long as said primary voltages are maintained higher than the corresponding secondary voltages, and is powered by DC power from said second power means when said primary voltages drop below the corresponding secondary voltages.

5. In Combination,
   a computer device comprising, at least, a microprocessor and a DC power bus;
   first power means for providing DC power to said computer device, said first power means comprising, at least, AC/DC converter means for converting AC power input to DC power output at a plurality of primary voltages in an array of varied voltages;
   power connect means for communicating said plurality of primary voltages to said DC bus of said computer device;
   second power means for providing DC power to said computer device at a plurality of secondary voltages in an array of varied voltages corresponding to said primary voltages;
   second power connect means for communicating said plurality of secondary voltages from said second power means directly to said DC bus of said computer device; each said secondary voltage corresponding to one of said primary voltages;

whereby as between a primary voltage and its corresponding secondary voltage the higher voltage is dominant in said DC bus.

6. Combination of claim 5, further comprising, at least, an interface member wherein said corresponding primary and secondary voltages are matched for delivery to the same conductor within said DC bus.

7. Combination of claim 5, wherein said second power supply comprises, at least:

first DC battery means for providing DC power at a first discharge voltage;

first circuit means for generating one or more of said secondary voltages from said first discharge voltage;

second DC battery means for providing DC power at a second discharge voltage;

second circuit means for generating one or more of said secondary voltages from said second discharge voltage.

8. Combination of claim 7, further comprising battery charging means for providing charging voltage to said first battery means and to said second battery means.

9. Combination of claim 8, wherein said first DC battery means comprises at least one DC battery; and wherein said second DC battery means comprises at least one DC battery; and wherein said battery charging means comprises, at least, second AC/DC converter means for converting AC power input to DC power at a first charging voltage at least sufficient to charge said DC battery of said first DC battery means and at a second charging voltage at least sufficient to charge said DC battery of said second DC battery means.

* * * * *